United States Patent
Helmick

(10) Patent No.: US 10,720,267 B2
(45) Date of Patent: Jul. 21, 2020

(54) APPARATUS FOR MAINTAINING WIRE SHIELDING POSITIONING DURING ELECTRICAL COMPONENT PLACEMENT

(71) Applicant: The Boeing Company, Chicago, IL (US)

(72) Inventor: Eerik J. Helmick, Seattle, WA (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 15/415,681

(22) Filed: Jan. 25, 2017

(65) Prior Publication Data

US 2018/0212410 A1 Jul. 26, 2018

(51) Int. Cl.
| | |
|---|---|
| *H01B 13/012* | (2006.01) |
| *B60R 16/02* | (2006.01) |
| *H02G 1/12* | (2006.01) |
| *H02G 1/14* | (2006.01) |
| *H01R 43/28* | (2006.01) |

(52) U.S. Cl.
CPC ... *H01B 13/01236* (2013.01); *B60R 16/0215* (2013.01); *H01R 43/28* (2013.01); *H02G 1/12* (2013.01); *H02G 1/14* (2013.01)

(58) Field of Classification Search
CPC ...... H01B 13/01236; H02G 1/12; H02G 1/14; H01R 43/28; B60R 16/0215
See application file for complete search history.

(56) References Cited

U.S. PATENT DOCUMENTS

| | | | | |
|---|---|---|---|---|
| 3,396,455 A | * | 8/1968 | Hugh | B23K 1/0053 174/84 R |
| 3,427,433 A | | 2/1969 | Foreman et al. | |
| 3,484,936 A | | 12/1969 | Schwalm et al. | |
| 4,229,155 A | * | 10/1980 | Gellatly | B29C 65/42 425/114 |
| 4,419,304 A | * | 12/1983 | Ficke | B29C 35/08 264/230 |
| 4,487,994 A | * | 12/1984 | Bahder | B29C 61/0616 156/49 |
| 4,581,478 A | * | 4/1986 | Pugh | H01B 7/0036 174/24 |

(Continued)

FOREIGN PATENT DOCUMENTS

| | | |
|---|---|---|
| JP | 2000-166046 | 6/2000 |
| WO | WO 96-32568 | 10/1996 |

*Primary Examiner* — Peter Dungba Vo
*Assistant Examiner* — Jeffrey T Carley
(74) *Attorney, Agent, or Firm* — Haynes and Boone, LLP

(57) ABSTRACT

An apparatus for facilitating an insertion of a wire surrounded by shielding into an electrical component so as to prevent a dislocation of the shielding during insertion is disclosed. The apparatus includes a wire receiver and one or more conduits within a body. The wire receiver has a cavity including a first end and a second end. A portion of the first end and second end define a wire axis along the cavity through the body and the cavity is configured to receive the wire along the wire axis. The conduits are connected to the cavity between the first end and second end and are configured to direct air flow radially into the cavity and in a direction outward through an air outlet at the first end of the cavity along the wire axis to force the shielding against the wire while the wire is inserted into the electrical component.

20 Claims, 9 Drawing Sheets

(56) References Cited

U.S. PATENT DOCUMENTS

| | | | | |
|---|---|---|---|---|
| 4,653,159 A | * | 3/1987 | Henderson | H01B 13/01245 140/93 R |
| 4,783,226 A | * | 11/1988 | Senn | H02G 1/14 118/65 |
| 5,467,515 A | * | 11/1995 | Luzzi | B23P 11/025 29/235 |
| 5,476,089 A | * | 12/1995 | Rose | B29C 61/00 126/401 |
| 2005/0202721 A1 | * | 9/2005 | Sakaue | H01R 43/005 439/587 |
| 2006/0137893 A1 | * | 6/2006 | Sumi | H01R 24/562 174/84 R |
| 2012/0217036 A1 | * | 8/2012 | Kuriyagawa | H01B 7/28 174/110 R |
| 2016/0027552 A1 | * | 1/2016 | Kuriyagawa | H01B 7/285 174/19 |
| 2016/0059800 A1 | * | 3/2016 | Hesse | H01R 43/28 29/705 |
| 2016/0199928 A1 | * | 7/2016 | Mukaiyama | B23K 1/002 219/605 |

\* cited by examiner

APPARATUS FOR MAINTAINING WIRE SHIELDING POSITIONING DURING ELECTRICAL COMPONENT PLACEMENT

TECHNICAL FIELD

The disclosure relates generally to wire processing and more specifically, for example, to wire processing for wire harnesses used in aircraft.

BACKGROUND

High reliability is often needed for wiring harnesses such as those used in aircraft subsystems. The production processes used to fabricate such harnesses utilize high quality components such as high quality wires, connections, and connectors. Assembly of such high quality components are required to be performed in a repeatable manner that minimizes failure. Such high standards have traditionally rendered automated wire assembly systems impractical for fabricating aircraft wiring harnesses.

SUMMARY

Systems and methods are disclosed herein for wire processing. In certain examples, an apparatus for facilitating an insertion of a wire surrounded by shielding into an electrical component so as to prevent a dislocation of the shielding during insertion is disclosed. The apparatus includes a wire receiver comprising a wire channel including a first end and a second end, where at least a portion of the first end and a portion of the second end defines a wire axis, and where the wire channel is configured to receive the wire along the wire axis, and one or more conduits disposed between the first end and the second end and configured to direct air flow radially inwardly toward the wire axis to force the shielding against the wire received by the wire channel.

In certain other examples, a method for inserting a wire surrounded by shielding into an electrical component without dislocating the shielding is disclosed. The method includes extending the wire toward the electrical component, and causing air flow directed radially inwardly to impinge against the shielding to prevent a dislocation of the shielding as the wire is moved towards and/or inserted into the electrical component.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Systems and techniques for wire processing are described in the disclosure herein in accordance with one or more examples. The wire processing system includes a plurality of processing stations and one or more of wire transports.

The systems and techniques described herein allow for improved wire processing in the manufacture of wire harnesses for aircraft applications. The systems and techniques described herein include a plurality of stations that manufacture such wire harnesses by performing one or more discreet steps in the manufacturing of such harnesses. Examples of such steps include receiving a coil of wire, stripping the wire at a predetermined area, inserting and/or positioning an electrical component over the stripped area, and soldering the electrical component over the stripped area. Certain other examples include additional steps in the manufacturing of such wire harnesses such as inserting the wire into a receptacle of a connector, soldering the wire to the connector, bundling together a plurality of wires, and attaching insulation to one or more wires.

While certain stations described herein can perform one step in the manufacture of such harnesses (e.g., stripping the wire at a predetermined area or positioning an electrical component over the stripped area), other stations can perform a plurality of discreet steps (e.g., positioning the electrical component over the stripped area and soldering the electrical component to the wire).

The stations described can also be modular stations. That is, the stations can be arranged as needed due to the requirements of the wire harness manufacturing steps. Accordingly, if two electrical components need to be soldered to the wire, then two such stations or sets of stations performing steps involved in soldering the electrical components to the wire can be used in the system.

As an illustrative example, such a wire processing system includes, at least, a wire transport that receives wire and transports the wire between various stations for processing. The system further includes a station that provides wire to the wire transport, a station that provides an electrical component to the wire and/or moves the electrical component on the wire, a station that strips a portion of the wire, a station that positions the electrical component over the stripped portion of the wire, and a station that solders the electrical component to the wire. Other examples can include other or additional stations and can arrange the stations in any number of ways.

Figure 1:
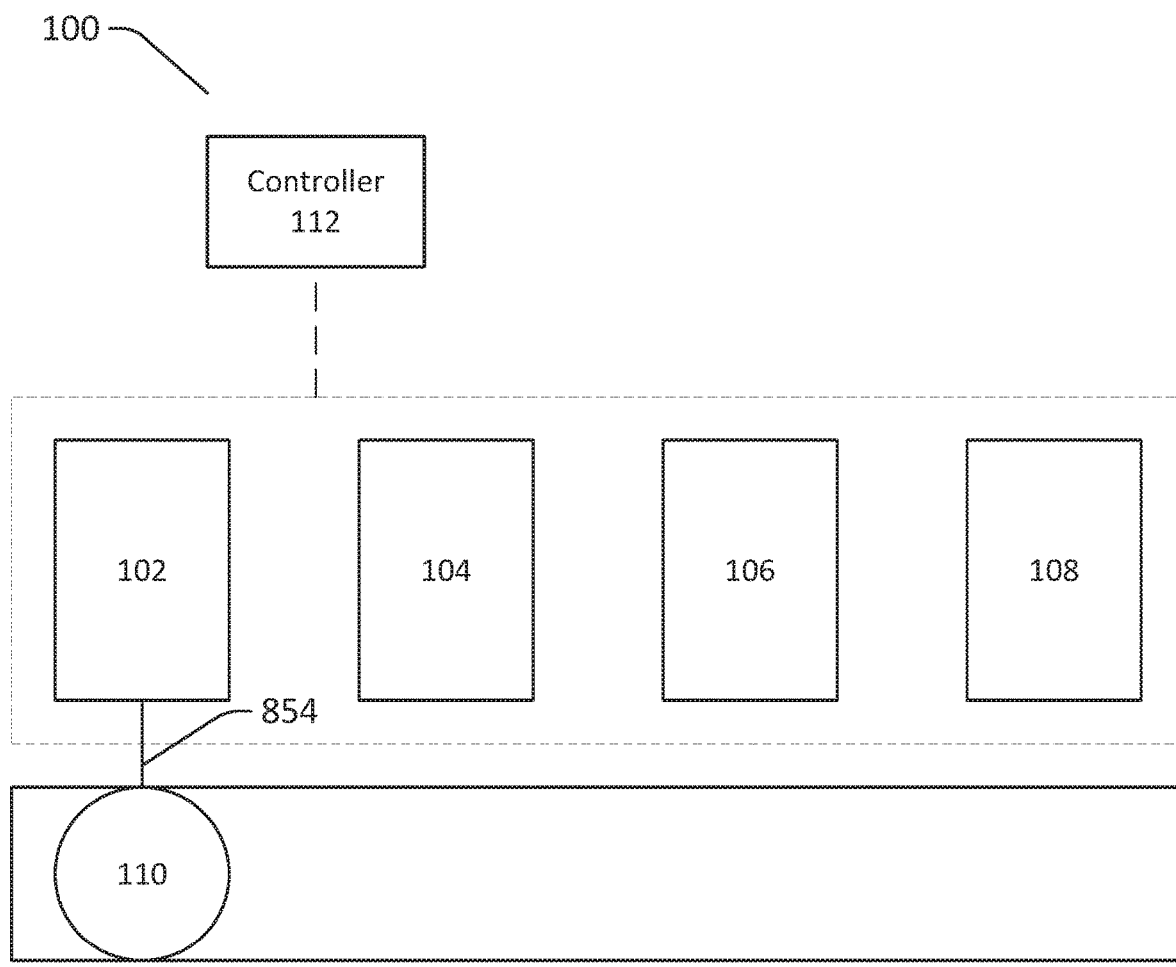
FIG. 1 illustrates a view of a wire processing system in accordance with an example of the disclosure.

As an illustrative example, a wire processing system is illustrated in FIG. 1. FIG. 1 illustrates a perspective view of a wire processing system 100 in accordance with an example of the disclosure. Wire processing system 100 includes a first station 102, a second station 104, a third station 106, a fourth station 108, and a wire transport 110A.

Stations 102-108 include one or more different types of wire processing stations. For example, such stations can provide wire to one or more rotational wire transports, cut wires, strip wires, slice wires, solder wires, attach one or more components (e.g., solder sleeves, connectors, Printed Circuit Boards (PCBs), and/or other such components) to the wires, and/or perform other wire processing and/or manufacturing steps. In certain such examples, the wire transport 110 is configured to receive wire 854 at one station and move the wire 854 to another station for further processing.

Station 102 is a station that provides the wire 854 to the wire transport 110. In the illustrated example, station 102 is providing wire 854 to wire transport 110. The wire 854 provided can be coiled around and/or within the wire transport 110. In certain examples, at least a portion of the wire 854 provided is held within a wire retaining tray of the wire transport 110.

In the illustrated example, the wire transport 110 can then move to a subsequent station, such as, for example, station 104, for further processing. It should be realized that in the illustrated embodiment, the processing system 100 is configured as an assembly line, such that after wire transport 110 receives the wire from station 102, wire transport 110 moves from station 102 to station 104 as described below.

The wire transport 110 then moves to another station, such as for example, station 104. The wire transport 110, in a certain example, moves between stations via one or more rails. As such, the wire transport 110 can be coupled to the one or more rails and the one or more rails can guide movement of the wire transport. The one or more rails can include mechanisms that move the wire transports and/or the wire transports themselves can include such mechanisms to move the wire transports between stations.

In the example shown in FIG. 1, station 104 is configured to receive the wire 854 and cut the wire 854 and/or strip a portion of the wire 854 (e.g., a portion of the insulation and/or shielding). Station 104, in certain examples, includes mechanisms that bottom against (e.g., physically contact) one or more bottoming features of the wire transport 110 and, from such bottoming features, then determine the area of the wire 854 to be stripped. As such, in certain such examples, a portion of the station 104 is configured to bottom against the feature, position itself against the bottoming feature to determine the portion of the wire 854 to be cut, cut the wire 854, and strip the wire 854 according to the position of the wire 854 relative to the bottoming feature.

The wire transport 110 then moves to station 106. In such an example, station 106 receives the wire transport 110 and positions the wire 854 of the wire transport 110 in an orientation to thread an electrical component onto the wire 854 and/or position the electrical component onto the stripped portion of the wire 854. The electrical component is installed on the wire 854 such that the electrical component is movable along a length of the wire. In further examples, the electrical component can be pre-installed on the wire, installed by hand, or installed using another technique. In such an example, the electrical component is then positioned over the stripped portion of the wire 854 in station 106.

The wire transport 110 then moves to station 108. Station 108 is configured to, for example, solder the electrical component onto the stripped portion of the wire 854. In certain other examples, other stations can, alternatively or additionally, perform other actions (e.g., couple one or more connectors to the wire, couple the wire to one or more other wires to form a harness, solder the wire to another wire or other electrical component, affix one or more identifying components such as stickers, print installation or other identifying information on the wire, and/or perform other such actions). Also, other examples can position one or more stations 102-108 in orders different from that described herein. Certain such examples can include fewer and/or additional stations.

In certain examples, one or more controllers (e.g., a controller 112) are configured to control the operation of the wire processing system 100 and/or one or more systems and/or subsystems thereof. The controller 112 includes, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 112 and/or its associated operations can be implemented as a single device or multiple devices (e.g., communicatively linked through analog, wired, or wireless connections such as through one or more communication channels) to collectively constitute the controller 112.

The controller 112 can include one or more memory components or devices to store data and information. The memory can include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 112 can be adapted to execute instructions stored within the memory to perform various methods and processes described herein.

Figure 2:
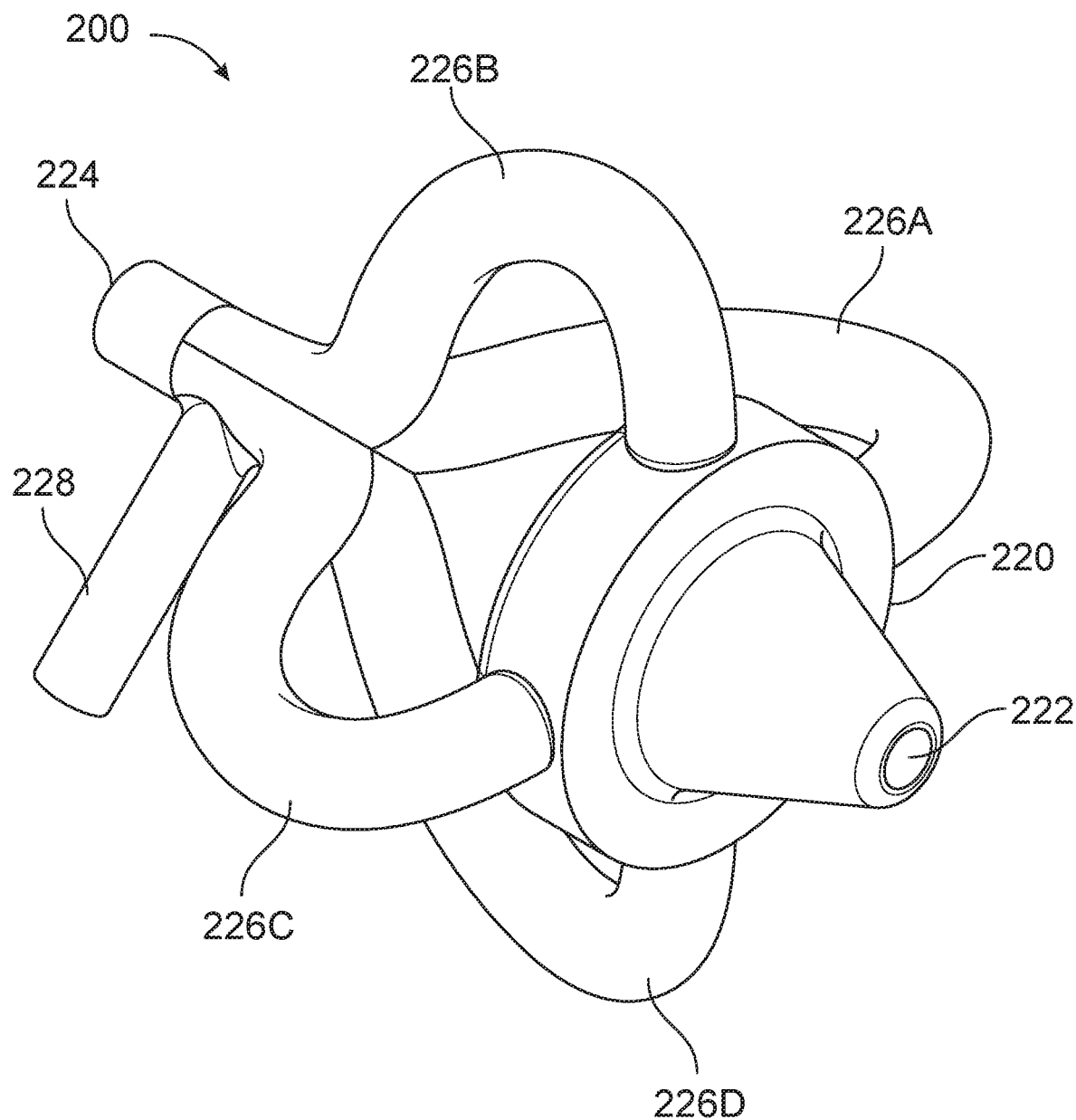
FIG. 2 illustrates a view of an air flow based wire shielding positioning device in accordance with an example of the disclosure.

FIG. 2 illustrates a view of an air flow based wire shielding positioning device in accordance with an example of the disclosure. The wire shielding positioning device illustrated in FIG. 2 can be configured to hold an electrical component (e.g., solder sleeve) and allow wire to be threaded through the solder sleeve. The apparatuses, systems, and techniques described herein can be used for processing of wires (e.g., a single conductor surrounded by insulation) and/or cables (e.g., multiple conductors surrounded by insulation). Such wires and/or cables can include insulation and/or shielding. It is appreciated that this disclosure refers to "wires" generically. As such, for the purposes of this disclosure, "wire" may refer to any conductor, including conductors with insulation and/or shielding, such as a single conductor with insulation and/or shielding (e.g., a wire) or multiple conductors with insulation and/or shielding (e.g., a cable), respectively.

Such wire can include a stripped portion. The wire can include a plurality of layers (e.g., a copper portion, a shielding portion layered on top of the copper portion, and an insulation portion layered on top of the shielding portion). When stripped, a portion of the shielding can be exposed. With conventional wire processing techniques, the exposed shielding can be caught on a portion of the electrical component when the wire is inserted and, thus, deform the shielding to an extent that fails manufacturing specifications and/or Federal Aviation Administration (FAA) standards.

The wire shielding positioning device 200 illustrated in FIG. 2 is configured to deliver air flow towards the wire as the wire is moved towards and/or inserted into the electrical component. Air flow from the wire shielding positioning device 200 is configured to impinge against the shielding of the wire to prevent dislocation of the shielding as the wire is inserted into the electrical component (e.g., by using the air flow to force the shielding against the wire). Accordingly, the shielding can then not be caught and/or deformed when the wire is inserted into the electrical component.

The wire shielding positioning device 200 illustrated in FIG. 2 includes a body 220. The body 220 includes conduits 226A-D, a wire receiver 222, and a stand 228.

The wire receiver 222 can include a cavity within the body 220. The wire receiver 222 can be sized to allow the wire to pass through the cavity, but can be sized to prevent the electrical component from passing through the cavity. In certain examples, at least one side of the wire receiver 222 is configured to hold the electrical component while the wire is inserted into the electrical component. Such a side can be shaped to receive the electrical component. Additionally, in certain examples, one or both ends of the cavity is chamfered and/or rounded to further prevent deformation of the shielding of the wire.

Figure 4:
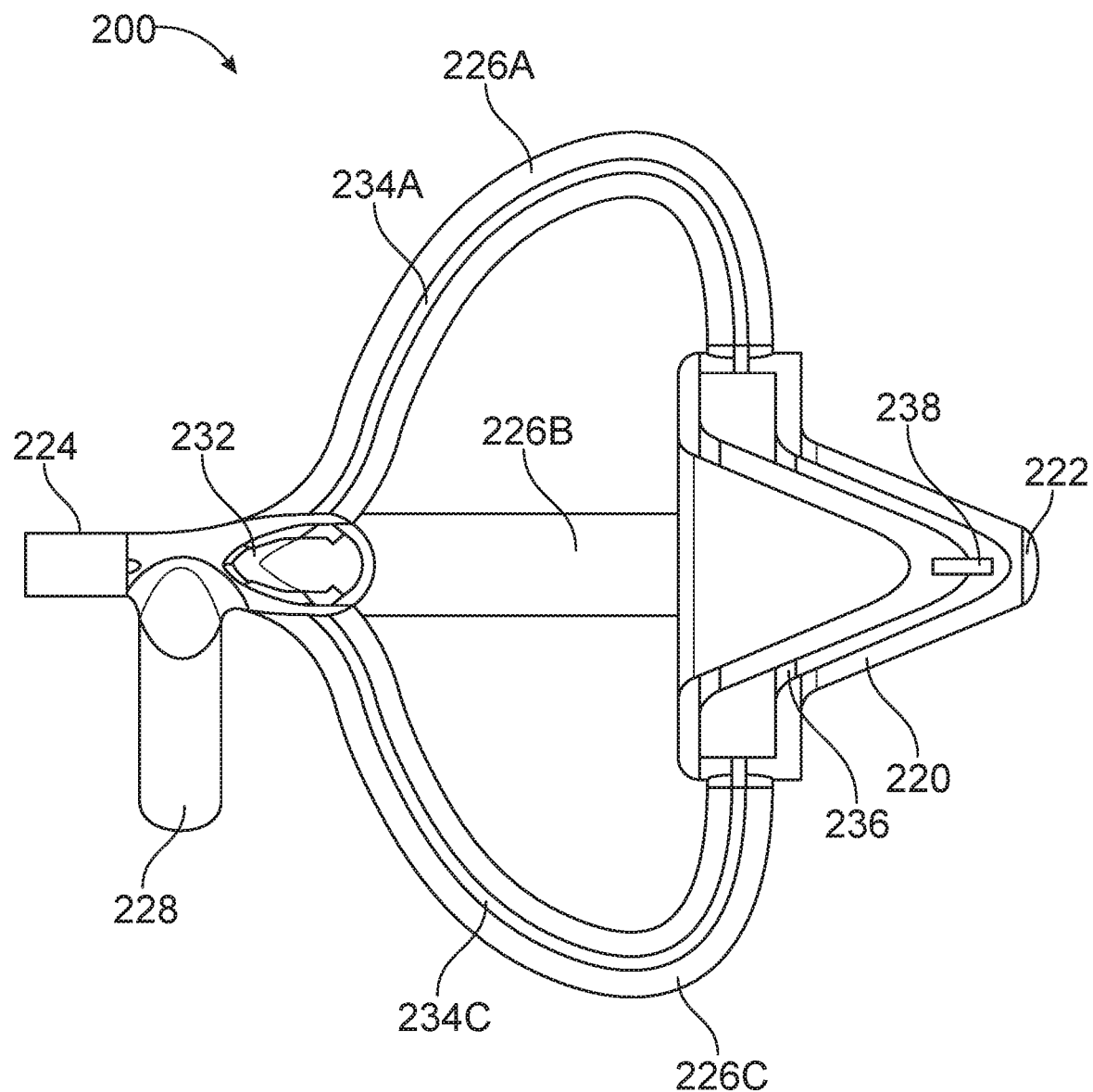
FIG. 4 illustrates a cutaway view of the air flow based wire shielding positioning device of FIG. 2 in accordance with an example of the disclosure.
Figure 5:
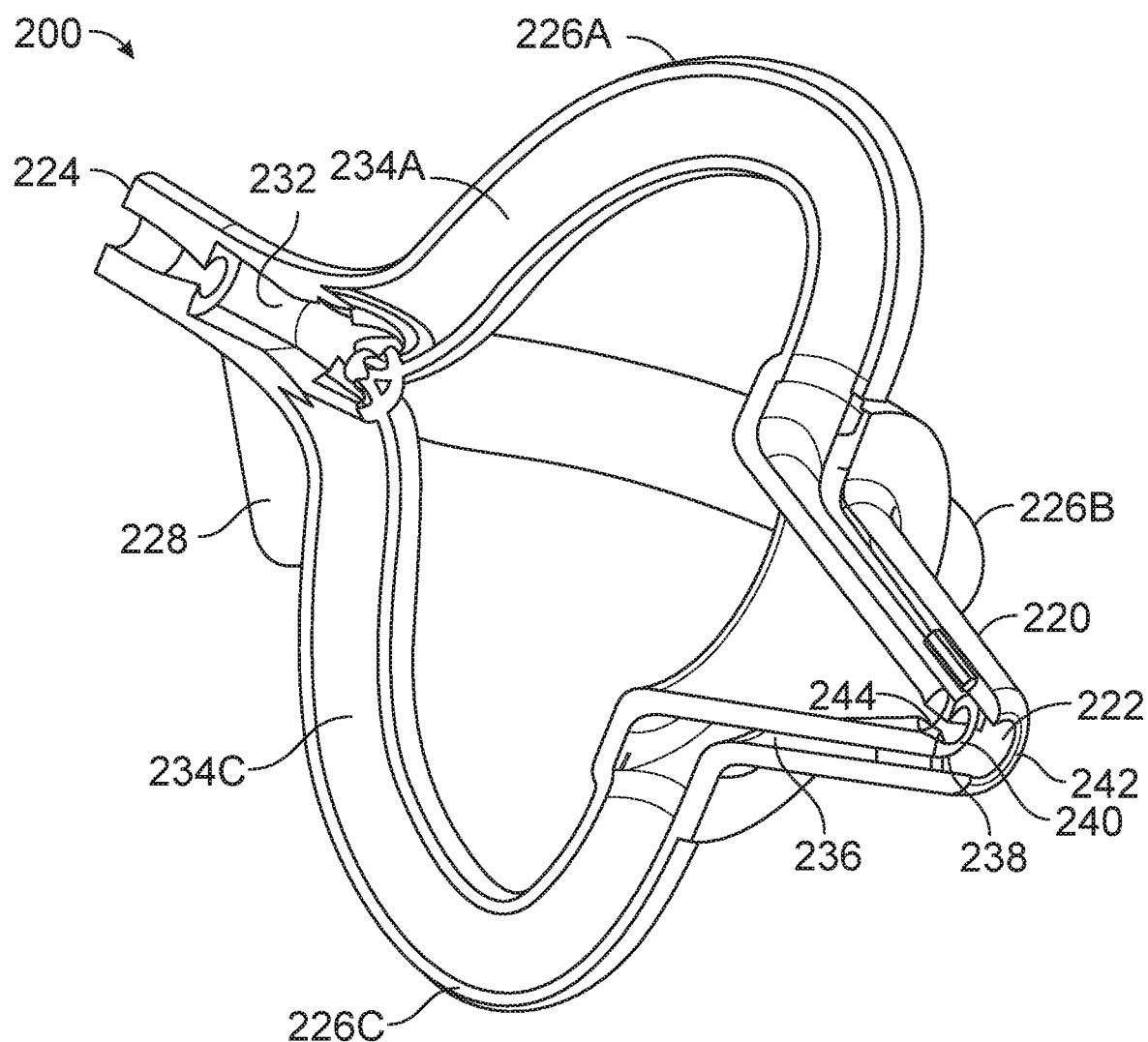
FIG. 5 illustrates another cutaway view of the air flow based wire shielding positioning device of FIG. 2 in accordance with an example of the disclosure.
Figure 6:
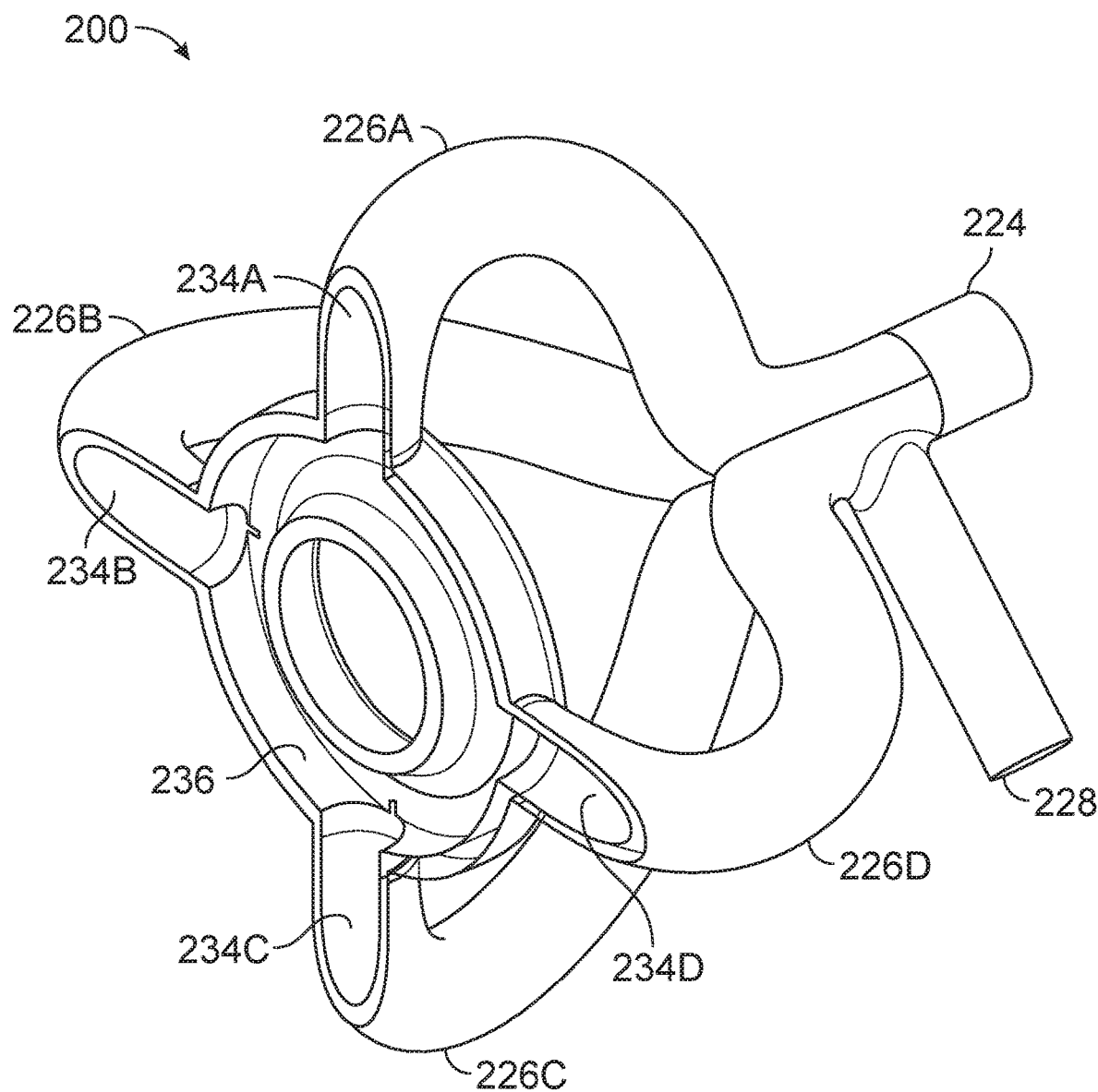
FIG. 6 illustrates a further cutaway view of the air flow based wire shielding positioning device of FIG. 2 in accordance with an example of the disclosure.

The conduits 226A-D each include at least one air channel (not shown, but shown in FIGS. 4-6). The air channels are fluidically connected to an air inlet 224 (e.g., fluid, such as air, can pass between the air inlet 224 and the air channels). Additionally, the air channels are fluidically connected to one or more air outlets (e.g., fluid, such as air, can pass between the one or more air channels and the one or more air outlets). The air outlets are configured to direct air flow radially inwardly toward the wire. Accordingly, air can flow into the one or more air inlets, through the one or more air channels, and then out of the one or more air outlets to impinge and/or force the shielding against the core portion of the wire (e.g., the copper portion) to prevent deformation of the shielding of the wire. In certain examples, the air outlets are configured to flow air into an area and/or volume defined by the cavity of the wire receiver 222. Such an area and/or volume can be located between the ends of the cavity.

Various examples of the wire shielding positioning device 200 can include any number of air inlets, air channels, and/or air outlets. The air inlets can each be fluidically connected to one or more air channels, and each of the air channels can be fluidically connected to one or more air outlets. In certain examples, a plurality of air channels is fluidically connected to the same air outlet, but other examples can include a plurality of air channels that are fluidically connected to different air outlets. In various examples, one or more conduits and/or air outlets are configured to direct the air flow substantially evenly to all of a perimeter of the wire. Additionally, the plurality of air channels can include substantially equal travel distances (e.g., centerline distances), substantially equal cross-sectional areas, and/or substantially equal air channel geometries so that the airflow velocity through the plurality of air channels are similar.

In certain examples, additional or alternative to separate air channels, the conduits can include an air channel that is disposed around all or a substantial portion of the wire receiver 222. Such a configuration can be configured to allow for substantially even flow of the air within the air channel, into the air outlet, and thus, onto the wire.

Other configurations of the conduits can, alternatively or additionally, include other features such as manifolds, plenums, baffles, and/or other features. Such conduits can be configured to deliver air flow to the wire to prevent deformation of the shielding of the wire. Certain such examples can be configured to deliver the air flow substantially evenly around a perimeter of the wire.

The stand 228 is configured so that the wire shielding positioning device 200 can be placed on a surface (e.g., table) and be level when placed on the surface.

Figure 3:
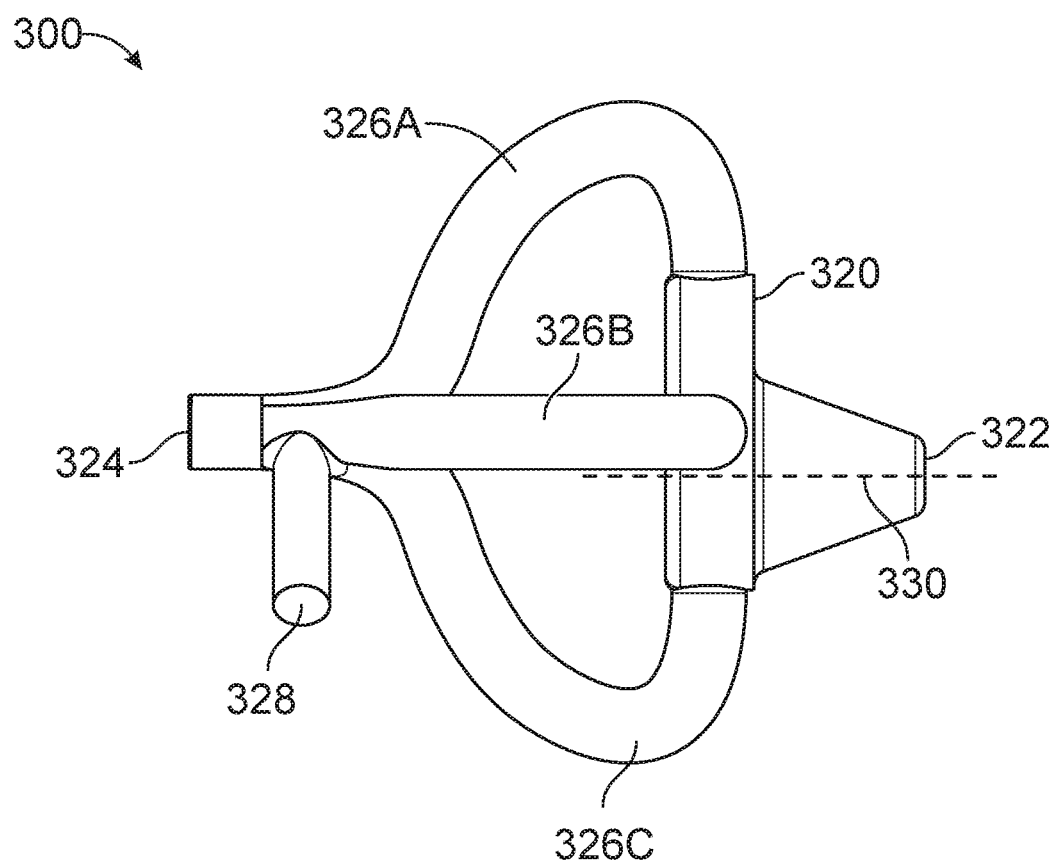
FIG. 3 illustrates a view of another air flow based wire shielding positioning device in accordance with an example of the disclosure.

FIG. 3 illustrates a view of another air flow based wire shielding positioning device in accordance with an example of the disclosure. The wire shielding positioning device 300 illustrated in FIG. 3 includes a body 320. The body 320 includes conduits 326A-D, a wire receiver 322, and a stand 328.

The conduits 326A-D and the stand 328 are similar to the conduits 226A-D and stand 228 described in FIG. 2 for the wire shielding positioning device 200. However, the wire receiver 322 of the wire shielding positioning device 300 is offset from the air inlet 324. As such, an axis 330 is defined by connecting the center points of the ends of the cavity of the wire receiver 322. The wire receiver 322 is configured to receive the wire along the axis 330 (e.g., the axis 330 can be moved and/or inserted into the electrical component along the axis 330). The axis 330 is offset from the air inlet 324 so that the axis 330 does not intersect any portion of the air inlet 324 and/or another portion of the wire shielding positioning device 300 when the axis 330 is extended. Thus, the wire can be moved and/or inserted into the electrical component in a substantially linear direction while not interfering with the air inlet 324 and/or another portion of the wire shielding positioning device 300.

FIG. 4 illustrates a cutaway view of the air flow based wire shielding positioning device of FIG. 2 in accordance with an example of the disclosure. FIG. 4 shows a side cutaway view of the wire shielding positioning device 200. As shown, conduit 226A includes air channel 234A, conduit 226C includes air channel 234C, and conduits 226B and 226D (not shown) include air channels 234B and 234D (not shown), respectively.

Air flow enters the conduits via the air inlet 224 and then splits into air channels 234A-D at intersection 232. As such, a single air inlet 224 can be fluidically connected to a plurality of air channels and allow air to flow into the plurality of air channels. Certain other examples can also include a plurality of air inlets and the plurality of air inlets can each direct air to one air channel or a plurality of air channels.

The air channels 234A-D are each configured to flow pressurized air. In certain examples, the air channels 234A-D include substantially smooth flow paths so as to minimize pressure drop and minimize turbulent flow. Additionally, the air channels 234A-D can include substantially equal travel distances (e.g., centerline distances), substantially equal cross-sectional areas, and/or substantially equal air channel geometries so that the airflow velocity through the plurality of air channels are similar.

Air flow from the air channels 234A-D then flows into a plenum 236. The plenum 236 combines air flow from the plurality of air channels 234A-D. In certain examples, the plenum 236 can be configured to combine the air flow from the plurality of air channels 234A-D so that components of the air flow are all flowing in substantially the same direction and/or velocity. Additionally, the plenum 236 can be disposed around the entirety or substantially the entirety of the outside of the cavity of the wire receiver 222. Thus, the plenum 236 can be configured to condition the air flow from the various air channels 234A-D so that air flow directed to the wire is substantially even around all of a perimeter of the wire to further aid in preventing deformation and/or dislocation of the shielding of the wire.

Air flow from the plenum 236 is directed to an air outlet 238. In the example shown, the air outlet 238 is disposed around a perimeter of a portion of the cavity of the wire receiver 222. Accordingly, the air outlet 238 directs air flow to substantially all of a perimeter of a portion of the wire. In certain examples, the air outlet 238 is disposed around an outer perimeter of the cavity and be configured to direct air flow radially inwardly into the cavity.

FIG. 5 illustrates another cutaway view of the air flow based wire shielding positioning device of FIG. 2 in accordance with an example of the disclosure. In FIG. 5, a cavity 240 of the wire receiver 222 is illustrated along with a first end 242 and a second end 244. Each of the first end 242 and the second end 244 are openings leading into the interior of the cavity 240. The first end 242 is configured to receive an electrical component and hold the electrical component to prevent the electrical component from passing from the first end 242 to the second end 244 through the cavity 240. Thus, the opening of the first end 242 can be sized larger than the wire, but smaller than the electrical component.

The second end 244 is configured to receive the wire (e.g., the wire can be inserted into the second end 244). One or both of the first end 242 and the second end 244 can include features to prevent further deformation of the shielding around the wire. Additionally, at least a portion of the air outlet 238 is disposed between the first end 242 and the second end 244 and is configured to flow air into the cavity 240 between the first end 242 and the second end 244. In certain examples, the air flow from the air outlet 238 can also flow into and/or be directed into portions of the electrical component so that, when the wire is inserted into the electrical component, the shielding will not be caught on any portion of the electrical component and deform and/or dislocate.

FIG. 6 illustrates a further cutaway view of the air flow based wire shielding positioning device of FIG. 2 in accordance with an example of the disclosure. The cutaway view of FIG. 6 shows the plenum 236. As shown, the plenum 236 receives air flow from the air channels 234A-D and is fully circular in shape. Combined with the view of FIG. 5, plenum 236 is funnel-shaped (e.g., tapers from large diameter cross-sectional area where it receives air flow from the air channels 234A-D to a small diameter cross-sectional area at the air outlet 238) and fully encircles the cavity 240 of the wire receiver 222. Such a circular funnel shape allows for more even delivery of air to the wire.

In other examples, the plenum 236 and/or the air channels and one or more air outlets can be configured in different shapes and quantities. Certain such configurations can, possibly, be fully symmetrical in shape, but such configurations can still configured to deliver air flow to the wire before the wire is inserted into and/or while the wire is inserted into the electrical component substantially even manner around the perimeter of the wire. Additionally, for examples with a plurality of air channels that are not disposed symmetrically around the wire receiver, air travel distances through the plurality of air channels can still be equal to ensure uniform flow. Such configurations can, for example, include an offset air inlet (as shown in FIG. 3) to allow the wire to be inserted into the electrical component in a substantially linear direction.

Figure 7:
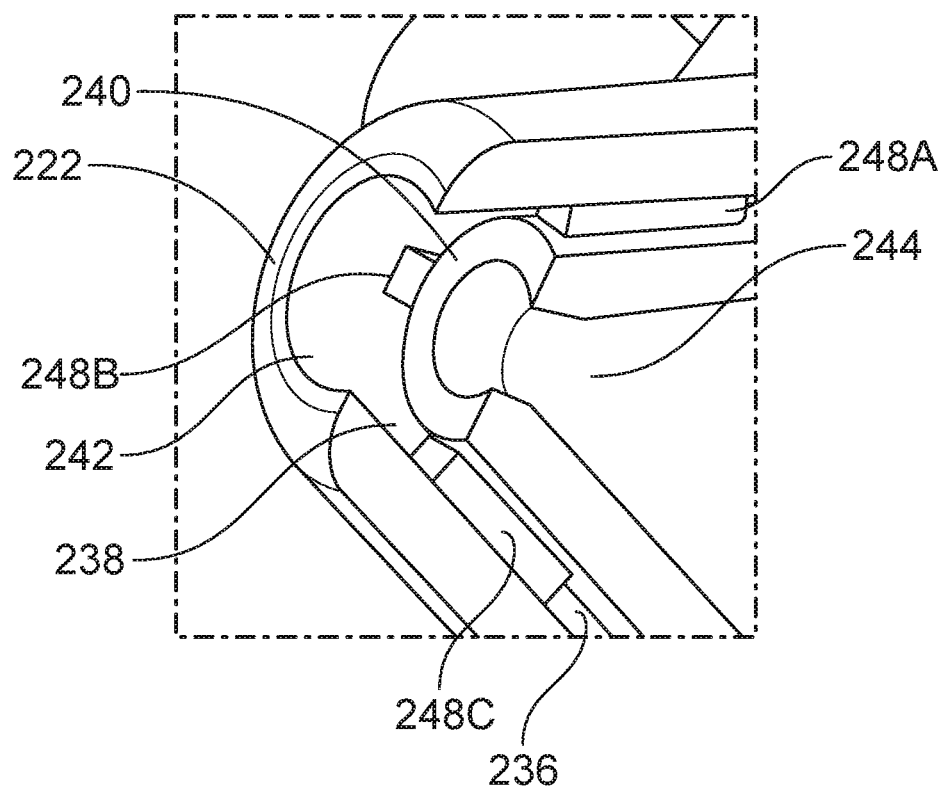
FIG. 7 illustrates a cutaway view of an air outlet of an air flow based wire shielding positioning device in accordance with an example of the disclosure.

FIG. 7 illustrates a cutaway view of an air outlet of an air flow based wire shielding positioning device in accordance with an example of the disclosure. FIG. 7 shows the cavity 240 of the wire receiver 222 with the first end 242 and the second end 244. The air outlet 238 receives air flow from the plenum 236 that fully encircles the cavity 240 and directs air flow into the cavity 240. While the example shown in FIG. 7 includes a plenum 236 and air outlet 238 that fully encircles the cavity 240, other examples can include one or more plenums and/or air outlets that do not fully encircle the cavity 240.

As shown, FIG. 7 also illustrates forms 248A-C. As the plenum 236 is funnel shaped, the plenum 236 is defined by at least an outer wall and an inner wall. The forms 248A-C connects the outer wall and inner wall and provides mechanical stiffness to the body of the wire shielding positioning device at the plenum 236. The forms 248A-C also divide the air outlet 238 into a plurality of outlets. The plurality of outlets are evenly disposed around the cavity 240.

Figure 8:
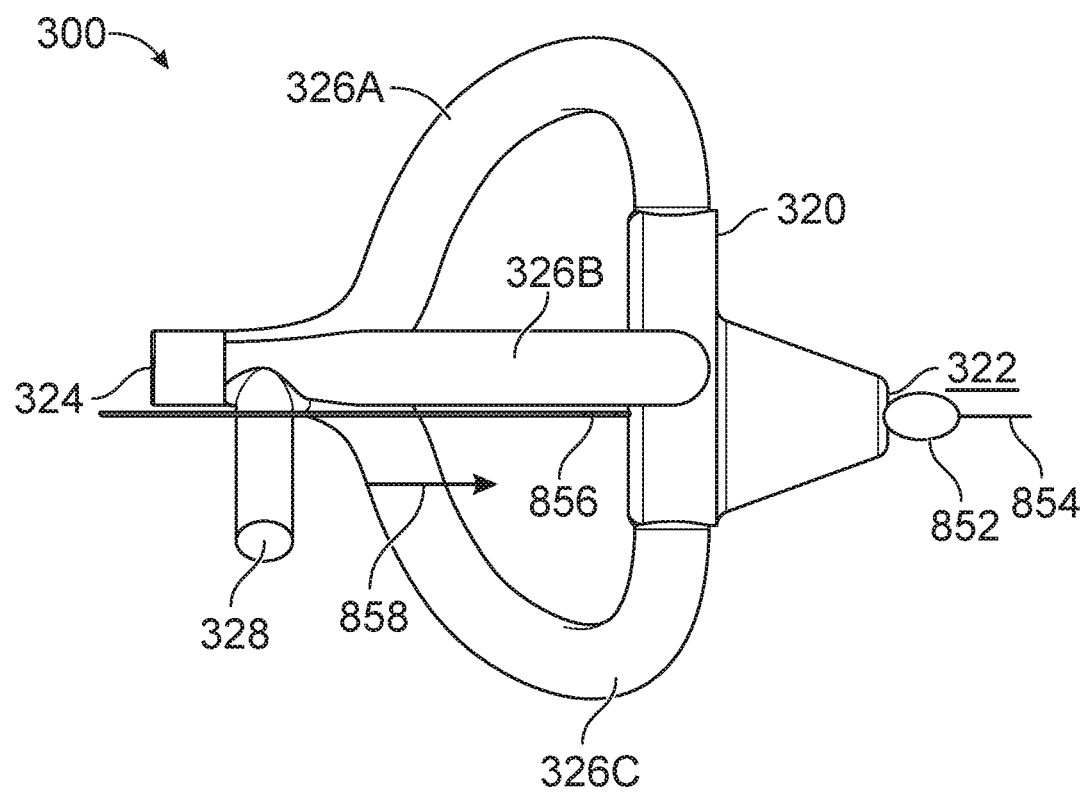
FIG. 8 illustrates a view of the air flow based wire shielding positioning device of FIG. 3 during operation in accordance with an example of the disclosure.

FIG. 8 illustrates a view of the air flow based wire shielding positioning device of FIG. 3 during operation in accordance with an example of the disclosure. In FIG. 8, the first end 324 of the wire receiver 322 holds an electrical component 852 (e.g., a solder sleeve). The wire 854 is first inserted into the second end (not shown) of the wire receiver 322 in direction 858. The wire 854 includes a stripped portion 856. The stripped portion 856 can include exposed shielding of the wire 854. As the wire 854 is moved/inserted into the cavity of the wire receiver 322 and/or the electrical component 852, pressurized air is received by the air inlet 324, flow through the air channels of the conduits 326A-D, and be directed to the wire by the one or more air outlets of the wire shielding positioning device 300. The pressurized air directed at the wire prevents deformation of exposed shielding of the stripped portion 856. In certain examples, the conduits 326A-D (e.g., the air outlets of the conduits 326A-D) include features configured to direct pressurized air that has exited from the one or more air outlets to flow and/or be driven through the electrical component while the wire is inserted into the electrical component, thus preventing and/or aiding in preventing deformation of the wire.

Figure 9:
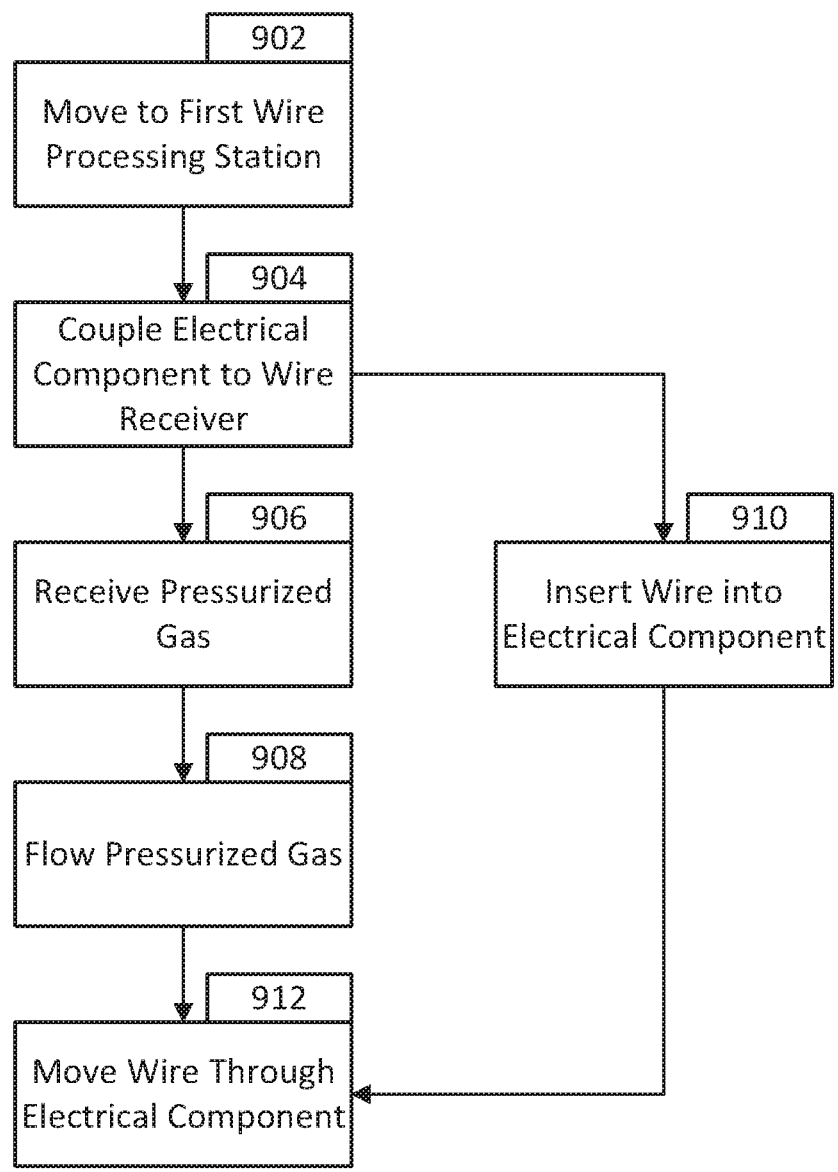
FIG. 9 is a flowchart detailing wire processing using the air flow based wire shielding positioning device in accordance with an example of the disclosure.

FIG. 9 is a flowchart detailing wire processing using the air flow based wire shielding positioning device in accordance with an example of the disclosure. In block 902, a wire transport holding one or more wires is moved to a first wire processing station. The wire can be provided to the wire transport from a previous wire processing station and the wire transport can then move to the first wire processing station. The first wire processing station includes a wire shielding positioning device to aid in the insertion of wire into an electrical component.

In block 904, the electrical component is coupled to the wire receiver (e.g., the first end of the wire receiver). The electrical component is held against the wire receiver with one or more features of the wire receiver and/or one or more features of the first wire processing station.

In block 910, wire is moved towards and/or inserted into the electrical component. The wire can include a stripped portion that exposes a portion of the shielding of the wire. Before and/or concurrently with moving/insertion of the wire into the electrical component in block 910, pressurized gas flows to one or more inlets of the wire shielding positioning device in block 906. The pressurized gas then flows through the wire shielding positioning device in block 908 (e.g., one of more air channels and through one or more air outlets).

The wire is then moved through the electrical component in block 912 as the air is flowing. The flow of air prevents the exposed shielding within the stripped portion of the wire from dislocating as the wire is moved by forcing the shielding against the wire.

Examples described above illustrate but do not limit the invention. It should also be understood that numerous modifications and variations are possible in accordance with the principles of the present invention. Accordingly, the scope of the invention is defined only by the following claims.

What is claimed is:

1. An apparatus for facilitating an insertion of a wire surrounded by shielding into an electrical component so as to prevent a dislocation of the shielding during insertion, the apparatus comprising:
a wire receiver within a body, the wire receiver having a cavity, the cavity including
a first end and
a second end,
wherein a portion of the first end and a portion of the second end defines a wire axis along the cavity through the body, and
wherein the cavity is configured to receive the wire along the wire axis from the second end to the first end; and
a plurality of conduits within the body, wherein the plurality of conduits are radially and fluidically coupled to the cavity with respect to the wire axis along the cavity between the first end and the second end and are configured to direct air flow radially into the cavity and in a direction outward through an air outlet of the body at the first end of the cavity along the wire axis to force the shielding against the wire while the wire is being inserted into the electrical component.

2. The apparatus of claim 1, wherein the plurality of conduits is configured to direct the air flow evenly to all of a perimeter of the wire.

3. The apparatus of claim 1, wherein each of the plurality of conduits comprises:
an air inlet configured to receive pressurized gas from a gas source,
an air channel of the conduit fluidically coupled to the air inlet, and
an air outlet of the conduit fluidically connected to the air channel and the air outlet of the body.

4. The apparatus of claim 3, wherein the air outlet of the conduit is at least partially disposed around a portion of an inner perimeter of the cavity.

5. The apparatus of claim 3, further comprising a plurality of air channels of the plurality of conduits, each air channel of the plurality of conduits fluidically coupled to the air inlet and the air outlet of the body.

6. The apparatus of claim 5, wherein each of the air channels of the plurality of conduits comprises a channel inlet fluidically coupled to the air inlet and a channel outlet fluidically coupled to the air outlet of the body, and wherein the channel outlets of the plurality of air channels of the plurality of conduits are evenly disposed around an inner perimeter of the cavity.

7. The apparatus of claim 5, wherein the plurality of air channels of the plurality of conduits have equal centerline distances.

8. The apparatus of claim 5, further comprising a plurality of air outlets, wherein each of the plurality of air outlets is fluidically coupled to at least one air channel of the plurality of conduits.

9. The apparatus of claim 3, wherein the air inlet is offset from the wire axis.

10. The apparatus of claim 1, wherein the first end is configured to receive the electrical component, prevent the electrical component from passing from the first end to the second end, and allow the wire to pass from the second end to the first end to be threaded into the electrical component.

11. The apparatus of claim 1, wherein the plurality of conduits includes a plurality of conduits, wherein the plurality of conduits are disposed evenly around an inner perimeter of the cavity.

12. The apparatus of claim 1, wherein the cavity is configured to hold the wire in a straight orientation.

13. The apparatus of claim 1, wherein the electrical component is a solder sleeve and wherein the first end is configured to receive the solder sleeve, prevent the solder sleeve from passing from the first end to the second end, and allow the wire to pass from the second end to the first end to be threaded into the solder sleeve.

14. A system comprising the apparatus of claim 1, the system further comprising:
a first wire processing station comprising the apparatus and configured to thread the electrical component onto the wire;
a second wire processing station; and
a wire carrier configured to transport the wire and configured to move to locations proximate the first wire processing station and the second wire processing station.

15. A method for inserting a wire surrounded by shielding into an electrical component without dislocating the shielding, the method comprising:
extending, with a wire receiver within a body, the wire toward the electrical component, wherein the wire receiver comprises a cavity comprising a first end and a second end, wherein at least a portion of the first end and a portion of the second end defines a wire axis along the cavity through the body, and wherein the cavity is configured to extend the wire along the wire axis; and
inserting the wire into the electrical component, including causing, with a plurality of conduits disposed between the first end and the second end, air flow directed radially into the cavity and in a direction outward through an air outlet of the body at the first end of the cavity along the wire axis to impinge against the shielding to prevent a dislocation of the shielding as the wire is inserted into the electrical component.

16. The method of claim 15, wherein the air flow is evenly directed to the entire perimeter of the wire.

17. The method of claim 15, further comprising:
holding the electrical component in a first position to allow for the wire to be moved towards and inserted into the electrical component.

18. The method of claim 15, wherein the air flow comprises pressurized gas received from a pressurized gas source.

19. The method of claim 15, wherein the causing air flow to impinge against the shielding comprises causing pressurized air to be driven through the electrical component while the wire is inserted into the electrical component.

20. The method of claim 15, wherein the wire is held by a wire carrier and the method further comprises:
moving the wire carrier to a position proximate to a first wire processing station before insertion of the wire into the electrical component; and
moving the wire carrier to a different wire processing station after inserting the wire into the electrical component.

* * * * *